April 23, 1968  G. F. AROYAN  3,379,891
VARIABLE FREQUENCY MODULATING RETICLE AND SYSTEM
Filed Aug. 25, 1965  2 Sheets-Sheet 1
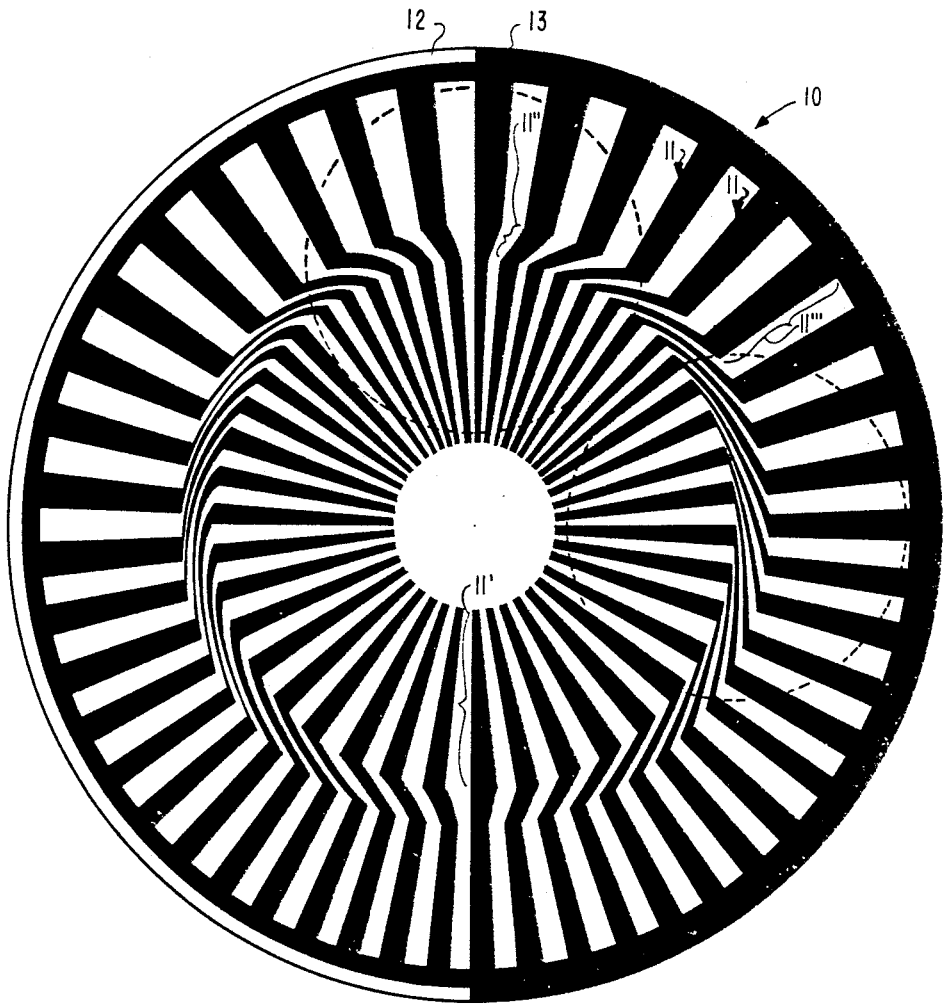
FIG. — 1
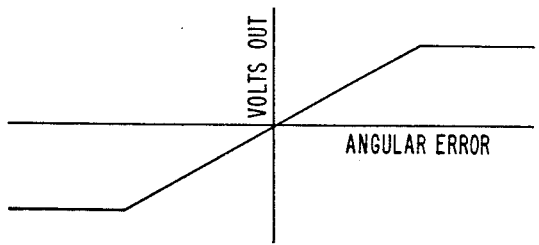
FIG. — 3
INVENTOR.
GEORGE F. AROYAN
BY *Fraser and Bogucki*
ATTORNEYS United States Patent Office 3,379,891
Patented Apr. 23, 1968

3,379,891
VARIABLE FREQUENCY MODULATING
RETICLE AND SYSTEM
George F. Aroyan, Woodland Hills, Calif., assignor to
Theodore R. Whitney, doing business as Pacific Infrared Systems Company, Reseda, Calif.
Filed Aug. 25, 1965, Ser. No. 482,543
10 Claims. (Cl. 250—233)

ABSTRACT OF THE DISCLOSURE

The reticle for frequency modulating a target image has a spoke pattern extending radially outward in which the angular widths of the spoke segments varies regularly in the circumferential direction between maximum and minimum limits in opposite directions on either side of a center line at a given radial distance, so that the frequency deviation of the modulated target image is directly indicative of its radial displacement from the center line. A system for locating target position in two orthogonal directions in a field of view focuses the field of view on the reticle at two different positions, with the mutually orthogonal axes of the field appropriately aligned with the center line.

---

This invention relates to radiation scanning and detecting devices and systems, and more particularly to reticles and modulation means utilized in such devices and systems.

It is now common to detect the presence of point or field sources of radiation in space through the use of scanning and tracking systems responsive to electromagnetic wave energy in the visible or nonvisible portions of the spectrum, including particularly the visible light and infrared regions of the spectrum. It is also now common to improve sensitivity and to lower signal to noise ratios through the use of modulation devices generally termed choppers or reticles. In these systems, one of the various types of rotating and nutating reticle systems may be disposed in a focal plane of the optical system that collects and focuses energy. Subsequently the energy is directed upon one or more radiation sensitive devices, amplified, and processed to provide target acquisition and tracking data. The reticle sometimes is in the form of a solid member having alternating spokes but more often is in the form of a transparent disk bearing a high opacity pattern. The moving pattern, in conjunction with the optical system, introduces a modulation component in the detected signal that can be used to effectively cancel substantial noise, thus increasing sensitivity and the signal to noise ratio.

A wide variety of reticle devices and systems are now in use, not only because of their signal enhancing properties but also because the modulation can advantageously be used for deriving additional information. The reticle pattern can vary with the position of the object in the field of view so that upon demodulation, position information can be derived. Size information can also be derived by techniques known as spatial filtering.

It will be understood by those skilled in the art that reticle systems may be used for acquisition or tracking, or both. The optical system concentrates a chosen field of view on the reticle, or a part thereof. The size of the field of view, and its position relative to the reticle, can be varied dependent upon the needs and design of the system. The image may be on center or off-center relative to the reticle, which itself may be rotated, nutated, or given some other motion. Introduction of the desired modulation function often requires extremely complex mechanical or electronic mechanisms, particularly when it is desired to perform both search and tracking functions. It is often preferable to derive position information in orthogonal coordinates, instead of in polar coordinates, and this can further complicate the system.

The modern techniques for modulation of received radiation in this type of system include AM, FM, PPM, PDM and random pulse modulation, among others. The frequency modulation technique has many advantages for a number of applications, and the present invention is concerned with this type of modulation and particularly wideband FM. The general principles of frequency modulation systems are well understood in the art and many different sophisticated forms have been devised, as evidenced by the United States Patents to Aroyan et al., Nos. 3,143,654 and 3,144,555.

It is therefore an object of the present invention to provide improved reticles for radiation scanning systems.

Another object of the present invention is to provide improved reticles for frequency modulation of electromagnetic wave energy in a radiation scanning system.

Yet another object of the present invention is to provide an improved radiation detection and tracking system including a reticle for frequency modulation of a radiation pattern in a field of view in such manner as to provide acquistition and tracking information in two orthogonal directions without a null at zero tracking error.

These and other objects are achieved by arrangements in accordance with the invention that comprise a reticle having generally radial spokes extending outwardly from a central axis and varying lengthwise to define three concentric sectors having different circumferential variations. The widths and spacings of the spokes in the inner and outer sectors vary in the circumferential direction such that, through a complete revolution, the angular spacing increases and then decreases. These variations are opposite between the inner and outer sectors, so that FM deviations of opposite phase are introduced in the detected signal. The intermediate or central sector has more pronounced spoke width and spacing variations in the circumferential direction. Whereas the spokes of the inner and outer sectors are radial, those of the intermediate sector are angular. The intermediate pattern is such that the only radius at which zero angular deviation occurs is at the radial center. Two image fields of view may be directed to fall on separate parts of the reticle in such fashion that information as to the position of a target in orthogonal coordinates is derived. The reticle is preferably rotated about a central axis that is off-center relative to the fields of view, and contains a separate pattern representative of phase information.

It is obvious to those skilled in the art that one could also accomplish that same result with 2, 3 or more cycles of FM around the reticle.

An aspect of the present invention is that a reticle formed in this fashion provides two wide outer acquisition fields, and a relatively narrow tracking field. The intermediate tracking field may have a linear deviation variation between saturation levels of opposite senses within the acquisition fields, as well as a null position at the center.

A better understanding of the invention may be had by reference to the following description, taken in conjunction with the accompanying drawings, in which:

FIG. 1 is a plan view of an improved reticle in accordance with the invention;

FIG. 3 is a graphical representation of the characteristic signal variations for varying positions of a target source relative to the fields of view of the reticle in the system of FIG. 2.

Figure 2:
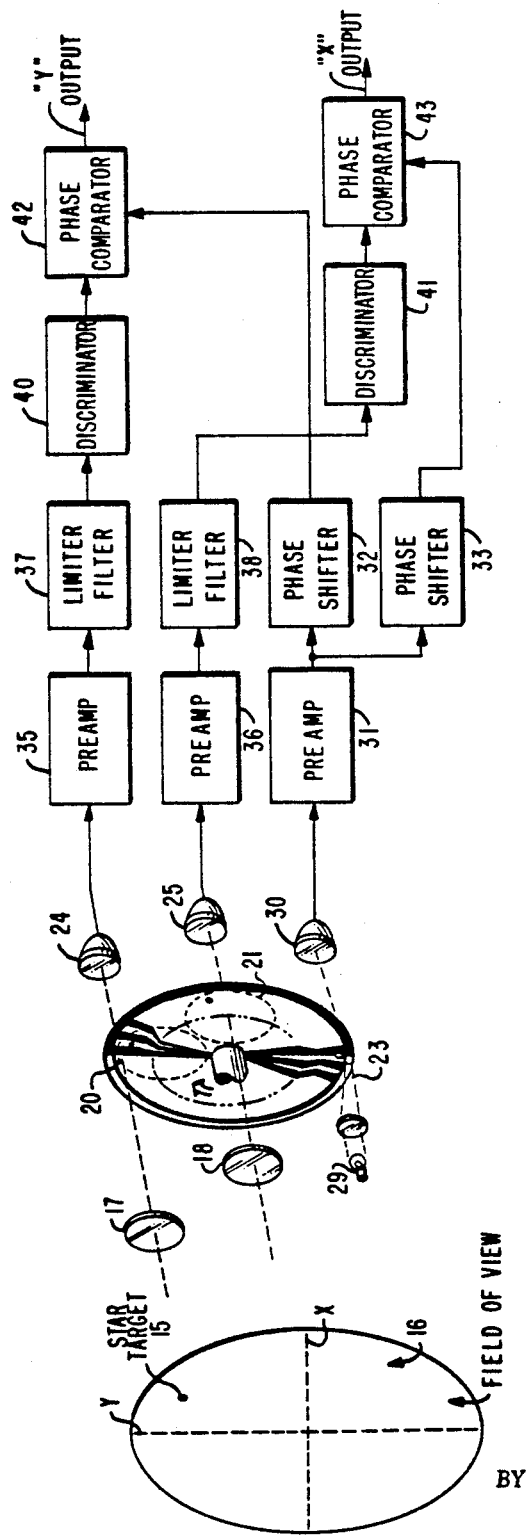
FIG. 2 is a generalized perspective and block diagram representation of a two field radiant energy search and tracking system in accordance with the invention utilizing the reticle of FIG. 1.

A reticle in accordance with the invention, referring now to FIGS. 1 and 3, comprises a planar disk 10 of radiation transmissive material, upon which is disposed a suitable pattern of elongated segments 11 of light reflective or light absorptive material By conventional photographic techniques which need not be described here, the disk 10 may be prepared to receive a precision optical pattern of the desired form. The elongated segments of high opacity or reflectivity in this pattern are disposed in generally radial fashion, and are spaced apart, so that they are appropriately referred to as spokes 11 on the disk 10. The disk 10 is rotated by conventional means (not shown) in the plane of the paper as viewed in FIG. 1, about its central axis.

Three concentric sectors are defined about the central axis by the radial variations in this array of continuous spokes 11. The spokes 11 may or may not emanate from the center of the disk 10, inasmuch as the useful radial length is determined by the size and position of the field of view and this may be small. It is assumed that the arrangement of FIG. 1 is to be used in conjunction with a two field tracker, as described below, and the typical area for each field of view in the X and Y axis directions is shown by dotted lines. It should be understood that for use with a precision search and track system, as contemplated by the present invention, substantially more radial spokes will be utilized than have been illustrated in FIG. 1. Typically, for a rotational rate of 60 cycles per second, a 720 spoke design may be utilized. It will also be recognized that modifications in the reticle pattern, such as the introduction of involutes or modified involutes, may be adopted for particular discrimination characteristics.

In the present example, the modulation region of the reticle comprises two imaged fields of view extending between inner and outer radial limits, each formed at the focal plane of a different optical system, as described generally below. The fields of view are illustrated in FIG. 1 by dotted line circles. Thus, the useful portion of the reticle extends between these limits, and no modulation pattern is needed outside these limits. The outer periphery, however, is utilized for a phase reference pattern, alternate 180° circumferential segments 12, 13 being energy transmissive and nontransmissive respectively, in order to provide a phase reference for demodulating signals from the reticle. In case the reticle pattern contained two or more cycles of FM, the phasing sectors would be modified appropriately to yield phase information relative to each FM cycle. The three concentric sectors defined by the individual spokes 11 each contain predetermined width and spacing variations of three different kinds, giving rise to different frequency modulation characteristics depending upon the position of a point source or target in the field of view. The three distinct but joined segments of a spoke 11 may be referred to as the inner, intermediate and outer segments 11', 11", and 11''' respectively.

In the inner and outer sectors, the separate segments 11' and 11''' of a given spoke 11 are angularly displaced from each other, and the spoke widths increase linearly in accordance with the radius. The spoke widths and spacings about the reticle, however, vary progressively between minimum and maximum limits over a full cycle. Further, relative to the phase reference pattern 12, 13 on the reticle and relative to each other, opposite phases exist. That is, the thickness of a spoke 11''' in the outer sector is a maximum along the same radius at which the thickness of the aligned spoke 11' in the inner sector is at a minimum, and vice versa. The spacings between the spokes 11' and 11''' are selected to be approximately equal to the width of the spokes in both sectors. Thus, the phase of the frequency modulation and thus the instantaneous frequency deviation superimposed upon the signal generated by a target imaged in one sector (inner or outer) is opposite in phase to that of a target imaged in the other sector. Because the spoke width varies linearly, the phase of the frequency modulation and thus the instantaneous deviation remains substantially the same, irrespective of variations in radial position within the inner or outer sectors. This provides what may be referred to as a saturation level in the frequency modulated signal.

In the intermediate sector, however, the spoke segments 11" interconnecting the inner and outer segments 11' and 11''' are arcuately disposed relative to the radii. These arcuate spoke segments 11" may take the form of an involute or modified involute, although other curves may be utilized as well. In any event, it is preferred to so dispose the spoke segments 11" in the intermediate sector that there is no width or spacing deviation circumferentially about the sector at the precise central radial position within the sector. Extending radially outwardly toward the outer sector, however, the spoke 11" widths vary circumferentially about the reticle in the same sense as and gradually approach the circumferential width deviations of the spokes 11''' in the outer sector. Conversely, in the direction from the center or null position toward the inner sector, the circumferential width deviations increasingly approach those of the spokes 11' in the inner sector.

The frequency modulation imposed upon a signal generated by a point source in any of the three sectors may then be demodulated to provide a demodulated signal amplitude dependent upon source position in accordance with the characteristic graphically illustrated in FIG. 3. This signal characteristic corresponds to that provided by a demodulator in the form of a phase discriminator system operating in response to the phase reference signal. When the target is in the inner and outer sectors, the generated signals are of like amplitude but of substantially opposite phase and opposite instantaneous polarity. Between the inner and outer sectors, the signal varies linearly between these two limits, with a null existing only at the center position. Consequently, the patterns at the inner and outer sectors give rise to saturation level signals that may be assumed to drive a servo at maximum rate toward the null position. As soon as the center sector is reached, the error signal diminishes in accordance with proximity to the null position. By the use of conventional lead and lag techniques, the servo may anticipate and precisely track the null position.

With two separate fields of view, target information is provided in two approximately orthogonal coordinates. The coordinates are precisely orthogonal when the target is in the center of the field of view. Alternatively, the two fields of view can be opposite each other, 180° apart on the reticle with one of the two fields of view rotated optically by some conventional means 90° with respect to the other then one field will yield azimuthal error information the other elevation error signal. The single reticle thereby serves to generate the signals for both fields, and to provide both acquisition and tracking control signals. The deviation ratio for the tracking field varies linearly throughout the field, and there is no loss of signal in the central field region, as happens with many systems. In a practical example of the system, utilizing 720 spokes, the intermediate sector comprises a 2/3° field of view. With a reticle rotation of 60 revolutions per second, a carrier of 43,200 c.p.s. is generated. For this wideband FM system, it can be shown that the angular resolution or precision within the tracking field is approximately ±2 seconds, for a field of approximately 2/3° diameter. Although a wider bandwidth is required than for comparable AM systems, the FM system can detect a weak signal source at a much lower signal to noise ratio, and thus has a greater sensitivity for the same angular accuracy.

One practical example of the system in accordance with the invention is shown in FIG. 2, and will be only very briefly described because reference may be made to a copending application of Theodore R. Whitney, Ser. No. 391,150, filed Aug. 21, 1964, and assigned to the assignee of the present application. As shown in FIG. 2, a star target 15 or other source of radiant energy within a field of view 16 is to be located with respect to X and Y coordinates within the field. A pair of optical systems 17, 18 focus the X and Y fields of view 20, 21 respectively in the focal plane of the reticle. A separate optical system focuses light from a source 29 as a spot 23 through the phase reference pattern on the reticle to a detector cell 30. Light transmitted through the reticle within each of the two imaged fields is focused on separate detectors 24, 25 It will be appreciated that the details of the optical systems may be conventional and accordingly have only been shown very generally. The processing circuits coupled to each of the photosensitive elements 24, 25, which may typically be a photomultiplier, are the same.

Phase reference signals are derived from a preamplifier 31 that receives signals from the phase reference photocell 30. The output signal from the preamplifier is applied through suitable phase shifters 32, 33 to introduce the amount of phase shift desired to distinguish between the X and Y axes in the broad field of view.

The detected signals are applied to preamplifiers 35 or 36, preferably broadband high gain amplifier circuits. From each preamplifier 35, 36, the signal is applied to limiter filter circuits 37, 38 respectively, the filters in these circuits typically encompassing symmetrical bandwidths about the frequencies given. For the carrier frequency given, a bandwidth of 33,000 to 53,000 c.p.s. has been found suitable. The limiting action may be achieved by amplifiers of the hard amplitude limiting type. Each signal from the limiter filter circuits 37, 38, respectively, is fed to a different discriminator circuit 40, 41, and subsequently to a phase comparator 42, 43 operating in response to the phase reference signal. The discriminator circuits 40 and 41 each generate a 60 c.p.s. signal, the amplitude of which is representative of the radial displacement of the target in a selected X or Y direction respectively from the radial center in the field of view and the phase of which indicates the sense of the displacement. The phase comparators 42, 43 determine the sense of the displacement by merely ascertaining which of two substantially opposite phase relationships exist in each case, and may thus be used to provide an appropriate output signal which, for example, might be a DC signal the amplitude of which is proportional to the size of the displacement and the polarity of which indicates the sense.

As a result, it is evident that the reticle provides a superior technique for generating signals representative of displacements in orthogonal directions in a two-field type of scanning system. Although the fields of view are off center with respect to the reticle, only a simple rotating motion need be imparted to the reticle itself.

While there have been described above and illustrated in the drawings a preferred form of reticle for modulation of received radiation in radiant energy systems, it will be appreciated that the invention is not limited thereto but encompasses all forms and variations falling within the scope of the appended claims.

What is claimed is:

1. A reticle for a radiant energy responsive system comprising a planar radiant energy transmissive member disposed about a central axis, the member including a pattern of generally radial spokes of nonenergy transmissive character, the spokes defining three concentric sectors, the angular spacings between the spokes in the inner and outer sectors being of energy transmissive character and varying regularly between maximum and minimum limits in the circumferential direction about the member, and the sense of the variations being opposite between the inner and outer sectors.

2. The invention as set forth in claim 1 above, wherein the spacings vary between maximum and minimum limits in a single complete cycle about the member.

3. A reticle movable with respect to an image source in a given direction for modulating radiant energy impinging thereon comprising a member providing alternating elongated segments of radiant energy transmissive and nontransmissive character, the elongated segments extending generally in the direction normal to the direction of movement and defining three abutting sectors extending in the direction of movement, the spacings and the widths of the elongated segments varying in a predetermined progression in the direction of movement and being opposite in sense in the two abutting sectors the center sector on opposite sides, and the spacings and the widths of the elongated segments varying both normal to and parallel to the direction of movement in the center sector.

4. An FM reticle for a radiant energy responsive system, for frequency modulating received radiation falling on a focal plane and comprising a planar radiant energy transmissive disk disposed for rotation about a central axis, the disk including a pattern of elongated segments of nonenergy transmissive character extending generally radially outwardly, the elongated segments and the light transmissive spacings therebetween comprising a spoke pattern defining three concentric sectors, the angular spacings between the spoke segments and the angular widths of the spoke segments in the inner and outer sectors varying regularly between maximum and minimum limits to define at least one complete cycle of variations extending in the circumferential direction about the disk, the sense of the thickness and spacing variations being opposite between the inner and outer sectors to frequency modulate in opposite phases point radiant energy sources focused in these sectors during rotation of the disk about its central axis, and the center intermediate sector having arcuate spoke segments varying gradually in thickness and spacing with a constant spoke thickness and spacing in the circumferential direction at the radial center of the sector.

5. The invention as set forth in claim 4 above, wherein the spoke variations in the inner and outer sectors provide substantially constant FM deviation relative to the rate of rotation about the central axis, and where the spoke thickness and spacing variations in the center intermediate sector vary in substantially linear fashion from the FM deviation at each region of juncture with the adjacent sectors.

6. An FM reticle for frequency modulating target sources of radiant energy disposed in a field of view, in a manner to provide both acquisition and tracking functions and comprising, a planar, radiant energy transmissive disk disposed about and rotatable about a central axis, the disk including a pattern of elongated spoke segments of nonenergy transmissive character extending generally outwardly relative to the central axis of the disk, and having angular thicknesses and spacing from adjacent segments such as to define a plurality of spokes, the spokes defining three concentric sectors including inner and outer sectors having substantially radial spoke segments and an intermediate sector having arcuate spoke segments, the spokes of the inner and outer sectors having thickness and spacing variations which are substantially linear with radial position along the spokes such that a change in displacement of a target source in a field of view encompassing the sector and along a radial line relative to the spokes does not alter the frequency deviation so that a substantially constant deviation ratio in a developed FM signal is defined, the deviation in the two inner and outer sectors being substantially equal in amplitude but opposite in sense in the circumferential direction, the arcuate spokes of the center sector having thickness and spacing variations in the circumferential direction about the sector changing with the radial position in the sector so that at each extreme the frequency deviation approaches the constant level of the adjacent inner or outer sector, and varies linearly between these levels through a null value at the radial center of the intermediate sector, the thickness and spacing of adjacent spokes at said radial center being constant in the circumferential direction about the reticle.

7. A radiant energy source tracking and control system comprising:
   a reticle movable with respect to an image source in a given direction for modulating radiant energy impinging thereon, comprising a member providing alternating elongated segments of radiant energy transmissive and nontransmissive character, the elongated segments extending generally in the direction normal to the direction of movement and defining three abutting sectors extending in the direction of movement, the spacings and the widths of the elongated segments varying in a predetermined progression in the direction of movement and being opposite in sense in the two sectors abutting the center sector on opposite sides, and the spacings and the widths of the elongated segments varying both normal to and parallel to the direction of movement in the center sector;
   focusing means for imaging the radiant energy in a field of view on said reticle in a predetermined position in the direction normal to the direction of movement and with a selected axial alignment;
   radiant energy sensing means for detecting the frequency modulation of the radiant energy produced by the reticle; and
   demodulating means responsive to the phase and frequency deviation of the detected frequency modulation to provide an output signal corresponding to the amplitude and phase of the frequency deviation to indicate the axial position of an image of a radiant energy source lying within the field of view in the direction normal to the direction of movement.

8. The radiant energy source tracking and control system in accordance with claim 7 wherein:
   the focusing means includes means for imaging the field of view at two separate locations on said reticle, the image of the field of view in one location having a first selected axial alignment relative to the direction of movement orthogonal to that of the image in the other location;
   said radiant energy sensing means including first and second sensing means for separately detecting the frequency modulation produced by the reticle at a respective one of said locations; and
   said demodulating means includes first and second means each responding to the phase and frequency deviation of a respective one of the detected frequency modulations to provide first and second output signals corresponding to the respective amplitude and phase of the frequency deviation to indicate the orthogonal axial positions of the radiant energy source within the field of view.

9. A radiant energy source tracking and control system comprising:
   a reticle for a radiant energy responsive system comprising a planar radiant energy transmissive member disposed about a central axis, the member including a pattern of generally radial spokes of nonenergy transmissive character, the spokes defining three concentric sectors, the angular spacings between the spokes in the inner and outer sectors being of energy transmissive character and varying regularly between maximum and minimum limits in the circumferential direction about the member, and the sense of the variations being opposite between the inner and outer sectors;
   focusing means for imaging the radiant energy in a field of view on said reticle in a predetermined radial and circumferential position to have a selected axial alignment relative to said sectors;
   means for rotating said reticle in the circumferential direction about said central axis at a substantially constant speed to frequency modulate the radiant energy from a source within the field of view imaged on said reticle;
   radiant energy sensing means for detecting the frequency modulation of the radiant energy produced by the rotating reticle; and
   demodulating means responsive to the phase and frequency deviation of the detected frequency modulation to provide an output signal corresponding to the amplitude and phase of the frequency deviation to indicate the radial position of the source image on said reticle within said sectors and thus to determine the position of the source within the field of view along the axis aligned in the radial direction.

10. A radiant energy detection and control system comprising:
   a reticle for frequency modulating target sources of radiant energy disposed in a field of view, said reticle including a planar radiant energy transmissive disk rotatable about a central axis with a spoke pattern of elongated segments of non-energy transmissive character extending generally outwardly from the central axis, said pattern defining a plurality of spokes each extending between inner and outer radial limits of an intermediate sector concentric with the central axis, the spoke segments at said inner and outer radial limits having gradual thickness and spacing variations between adjacent spokes of substantially the same relative amplitude in the circumferential direction but of opposite sense, and the spoke segments between the inner and outer radial limits having thickness and spacing variations in the circumferential direction changing with the radial position in the sector so that the frequency deviation of the modulation produced at any given radial position within said intermediate sector vary substantially linearly though a null value at a predetermined radial distance intermediate said inner and outer limits, the thickness and spacing of adjacent spokes at said predetermined radial distance being constant in the circumferential direction;
   focusing means for imaging the radiant energy in a field of view on said intermediate sector of said reticle in at least one predetermined position;
   radiant energy sensing means for detecting the frequency modulation of the radiant energy from a source within the field of view produced by the spokes of the rotating reticle at each predetermined position; and
   separate demodulating means responsive to the phase and frequency deviation of the frequency modulation detected by the sensing means to provide an output signal corresponding to the amplitude and phase of the frequency deviation to indicate the radial position of the source image relative to said predetermined radial distance.

References Cited

UNITED STATES PATENTS

| 2,931,912 | 4/1960 | Macleish | 250—203 |
| 2,961,545 | 11/1960 | Astheimer et al. | 250—203 |
| 2,997,699 | 8/1961 | Lovell | 250—203 X |
| 3,081,666 | 3/1963 | Calhoun et al. | 250—233 X |
| 3,143,654 | 8/1964 | Aroyan et al. | 250—233 |
| 3,144,555 | 8/1964 | Aroyan et al. | 250—233 X |
| 3,180,206 | 4/1965 | Harris et al. | 350—274 X |
| 3,239,674 | 3/1966 | Aroyan | 250—233 X |
| 3,263,084 | 7/1966 | Boydell | 250—233 X |
| 3,291,991 | 12/1966 | Welti | 250—233 X |

RALPH G. NILSON, *Primary Examiner.*

M. A. LEAVITT, *Assistant Examiner.*